(12) United States Patent
Floreck et al.

(10) Patent No.: US 11,124,246 B2
(45) Date of Patent: Sep. 21, 2021

(54) ROOF-ATTACHMENT SYSTEM AND METHOD

(71) Applicant: Dr. Ing. h.c. F. Porsche Aktiengesellschaft, Stuttgart (DE)

(72) Inventors: Mirko Floreck, Eberdingen (DE); Reiner Armbruster, Muehlacker (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/845,334

(22) Filed: Apr. 10, 2020

(65) Prior Publication Data

US 2020/0324829 A1 Oct. 15, 2020

(30) Foreign Application Priority Data

Apr. 11, 2019 (DE) .................. 10 2019 109 591.3

(51) Int. Cl.
| | |
|---|---|
| *B62D 25/06* | (2006.01) |
| *B62D 27/00* | (2006.01) |
| *B62D 27/02* | (2006.01) |
| *B60J 10/40* | (2016.01) |
| *B60J 10/16* | (2016.01) |
| *B60J 10/26* | (2016.01) |
| *B60J 10/00* | (2016.01) |

(52) U.S. Cl.
CPC ............ *B62D 27/026* (2013.01); *B60J 10/16* (2016.02); *B60J 10/26* (2016.02); *B60J 10/40* (2016.02); *B60J 10/45* (2016.02); *B62D 25/06* (2013.01)

(58) Field of Classification Search
CPC ... B60J 10/16; B60J 10/26; B60J 10/40; B60J 10/45; B60J 10/82; B60J 10/90; B62D 25/06; B62D 27/026
USPC ........................................ 206/216.06–216.09
See application file for complete search history.

(56) References Cited

U.S. PATENT DOCUMENTS

| | | | | |
|---|---|---|---|---|
| 4,738,482 A | * | 4/1988 | Bohm ................ | B60J 10/82 296/201 |
| 6,283,542 B1 | * | 9/2001 | Patz .................. | B60J 7/00 296/211 |
| 6,367,872 B1 | | 4/2002 | Bohm et al. | |
| 6,378,936 B1 | | 4/2002 | Grimm et al. | |
| 6,409,258 B1 | | 6/2002 | Grimm et al. | |
| 6,540,289 B2 | * | 4/2003 | Bergmiller ........ | B29C 44/385 296/216.09 |
| 6,893,084 B2 | * | 5/2005 | Tamura ............. | B60J 10/24 296/216.09 |

(Continued)

FOREIGN PATENT DOCUMENTS

| | | |
|---|---|---|
| DE | 19946804 A1 | 4/2001 |
| DE | 19947238 A1 | 4/2001 |
| EP | 0960803 A2 | 12/1999 |

(Continued)

*Primary Examiner* — Dennis H Pedder
(74) *Attorney, Agent, or Firm* — RatnerPrestia

(57) ABSTRACT

A roof-attachment system and method for attaching a glass roof to the bodyshell of a motor vehicle, having a foam surround and having an adhesive, which, for the purpose of fastening the glass roof on the bodyshell in a materially bonded manner, is connected firstly to the glass roof, secondly to the foam surround and thirdly to the bodyshell. At an interface between the glass roof, the foam surround, and the adhesive, a step between the adhesive and the foam surround is provided with a chamfer.

10 Claims, 2 Drawing Sheets

(56) References Cited

U.S. PATENT DOCUMENTS 7,404,598 B2 * 7/2008 Huebner .................. B60J 7/00
                                              296/216.09

FOREIGN PATENT DOCUMENTS

| JP | S6444386 | 2/1989 |
| WO | 2006134832 A1 | 12/2006 |
| WO | 2019008746 A1 | 1/2019 |

* cited by examiner

ROOF-ATTACHMENT SYSTEM AND METHOD

CROSS-REFERENCE TO RELATED APPLICATION

This application claims priority to German Patent Application No. 10 2019 109 591.3, filed Apr. 11, 2019, the content of such application being incorporated by reference herein in its entirety.

FIELD OF THE INVENTION

The invention relates to a roof-attachment system for attaching a glass roof to the bodyshell of a motor vehicle, having a foam surround and having an adhesive, which, for the purpose of fastening the glass roof on the bodyshell in a materially bonded manner, is connected firstly to the glass roof, secondly to the foam surround and thirdly to the bodyshell. The invention also relates to a method for installing a glass roof on the bodyshell of a motor vehicle, having a foam surround and having an adhesive, which, for the purpose of fastening the glass roof on the bodyshell in a materially bonded manner, is connected to the glass roof, to the foam surround and to the bodyshell. The invention further relates to a method and a tool for surrounding a glass roof with foam or encapsulating the same in a foam surround.

BACKGROUND OF THE INVENTION

German patent specification DE 199 46 804 C2, which is incorporated by reference herein, discloses a vehicle-roof module, in particular for motor vehicles, which has a rigid roof skin with a foamed-plastic inner shell foamed in place on the inner surface of the roof skin, is produced separately from the vehicle body, can have its outer peripheries positioned on a body frame, and fixed to the same, has a roof opening in the rigid roof skin, it being possible for said roof opening to be closed by a sliding cover of a sliding unit, and is equipped with a sliding frame which is fastened beneath the roof skin and is intended for bearing and guiding the functional elements of the sliding-roof unit, wherein the sliding roof frame is fastened on the inner shell at a plurality of spaced-apart locations, which are distributed around the roof opening, said fastening being achieved by means of elements (nut, anchor and protrusion) which are present, and therefore fixed, only at said locations. German laid-open specification DE 199 47 238 A1, which is also incorporated by reference in its entirety, discloses a vehicle roof, in particular for motor vehicles, having a rigid roof skin and a plastic inner shell foamed in place on the inner surface of the roof skin, wherein a roof lining is connected to the inner shell, and wherein the roof lining, which is preformed from foamed plastic as a separate part, is provided on its upper side with latching elements which are latched in a releasable manner to complementary latching elements which are fitted on the inner shell so as to fit precisely with the latching elements on the roof lining. European laid-open specification EP 0 960 803 A2, which is incorporated by reference herein, discloses a vehicle roof, in particular a motor-vehicle roof, which is designed in a sandwich-like manner with a roof skin, is produced separately from the vehicle body, can have its roof peripheries positioned on a body frame, and fixed thereto, wherein the roof skin, which is provided for accommodating a sliding cover by way of a roof opening, is filled with a foamed plastic, wherein the foam layer has embedded in it a piece of hose or tubing by means of which water which enters in via the peripheral gap between the roof skin and the sliding cover and is collected by a sliding roof frame fastened beneath the roof skin, can be channeled away in the outward direction.

SUMMARY OF THE INVENTION

It would be desirable to improve further the attachment of a glass roof to the bodyshell of a motor vehicle, having a foam surround and having an adhesive, which, for the purpose of fastening the glass roof on the bodyshell in a materially bonded manner, is connected firstly to the glass roof, secondly to the foam surround and thirdly to the bodyshell.

In the case of a roof-attachment system for attaching a glass roof to the bodyshell of a motor vehicle, having a foam surround and having an adhesive, which, for the purpose of fastening the glass roof on the bodyshell in a materially bonded manner, is connected firstly to the glass roof, secondly to the foam surround and thirdly to the bodyshell, and, at an interface between the glass roof, the foam surround and the adhesive, a step between the adhesive and the foam surround is provided with a chamfer. The glass roof is preferably a laminated-glass roof comprising a plurality of laminated-glass layers. The bodyshell of the motor vehicle is formed, for example, from a metallic material. The foam surround or encapsulation of the glass roof is formed preferably from a plastic material. The plastic material is, for example, polyurethane, which is also abbreviated to PUR or PU. The foam surround can also be formed from a thermoplastic elastomer, which is also abbreviated to TPE. The adhesive is, for example, a conventional adhesive material as is used for the adhesive bonding of foam-surrounded glass roofs. As seen in cross section, the step delimits an elongate region in which the foam surround is arranged between the adhesive and the glass roof. The chamfer, which is formed on the foam surround, advantageously allows potential leakage locations to be avoided.

A preferred exemplary embodiment of the roof-attachment system is characterized in that, as seen in cross section, the chamfer runs rectilinearly between the glass roof and the adhesive. As seen in cross section, the chamfer can run rectilinearly. However, as seen in cross section, the chamfer can also exhibit a certain undulating form. Depending on the tool it is also possible for the chamfer, as seen in cross section, to be curved.

A further preferred exemplary embodiment of the roof-attachment system is characterized in that a chamfer angle between the glass roof and the foam surround is greater than twenty-five degrees and smaller than sixty-five degrees. The chamfer angle between the glass roof and the foam surround is preferably approximately forty-five degrees.

A further preferred exemplary embodiment of the roof-attachment system is characterized in that, as seen in cross section, the chamfer is curved preferably convexly, at least to some extent, between the glass roof and the adhesive. The chamfer, which is preferably formed on the foam surround, advantageously serves to fill an inherently undesirable cavity between the adhesive and the foam surround.

A further preferred exemplary embodiment of the roof-attachment system is characterized in that the foam surround and the adhesive are connected to one another in a materially bonded manner in the region of the chamfer. The foam surround and the adhesive are connected to one another in a materially bonded manner preferably at least to some extent, particularly advantageously to the greatest possible extent or fully, in the region of the chamfer. It is thus possible to minimize an inherently undesirable cavity in the region of the chamfer between the foam surround and the adhesive.

In the case of a method for installing a glass roof on the bodyshell of a motor vehicle, having a foam surround and having an adhesive, which, for the purpose of fastening the glass roof on the bodyshell in a materially bonded manner, is connected to the glass roof, to the foam surround and to the bodyshell. A potential leakage location between the adhesive and the foam surround is, to the greatest possible extent, filled. As a result, the situation where for example water penetrates in an undesirable manner into the interior of a glass-roof-containing motor vehicle when the latter is being operated is reliably prevented.

A preferred exemplary embodiment of the method is characterized in that the potential leakage location between the adhesive and the foam surround is minimized with the aid of an above described roof-attachment system. The chamfer makes it easier for the adhesive to advance up to the foam surround in an undesirable manner during installation.

In the case of a method for surrounding a glass roof with foam or encapsulating the same in a foam surround. When the glass roof is being surrounded with foam or encapsulated in the foam surround, a chamfer is produced on the foam surround. The chamfer is a straightforward means of minimizing a potential leakage location between the adhesive and the foam surround, because the adhesive can advance up to the chamfer on the foam surround more easily than up to a ninety-degree edge on a conventional foam surround.

In the case of a tool for surrounding a glass roof with foam or encapsulating the same in a foam surround using a method described above. The tool has arranged in it a seal with a shaping geometry for producing the chamfer between the glass roof and the tool. The seal is advantageously formed from a material which is different to, in particular softer than, that of the tool. The seal is formed, for example, from an elastomeric material, for example a rubber material. The elastomeric material is, for example, a silicone material. The tool is advantageously formed from a metallic material. The relatively soft seal is a straightforward way of avoiding damage to the glass roof in the tool.

The invention further relates to a motor vehicle having a glass roof which is attached to the bodyshell of the motor vehicle by a roof-attachment system described above.

BRIEF DESCRIPTION OF THE DRAWING FIGURES

Further advantages, features and details of the invention can be gathered from the following description, which gives a detailed description of various exemplary embodiments with reference to the drawing, in which.

DETAILED DESCRIPTION OF THE INVENTION

Figure 1:
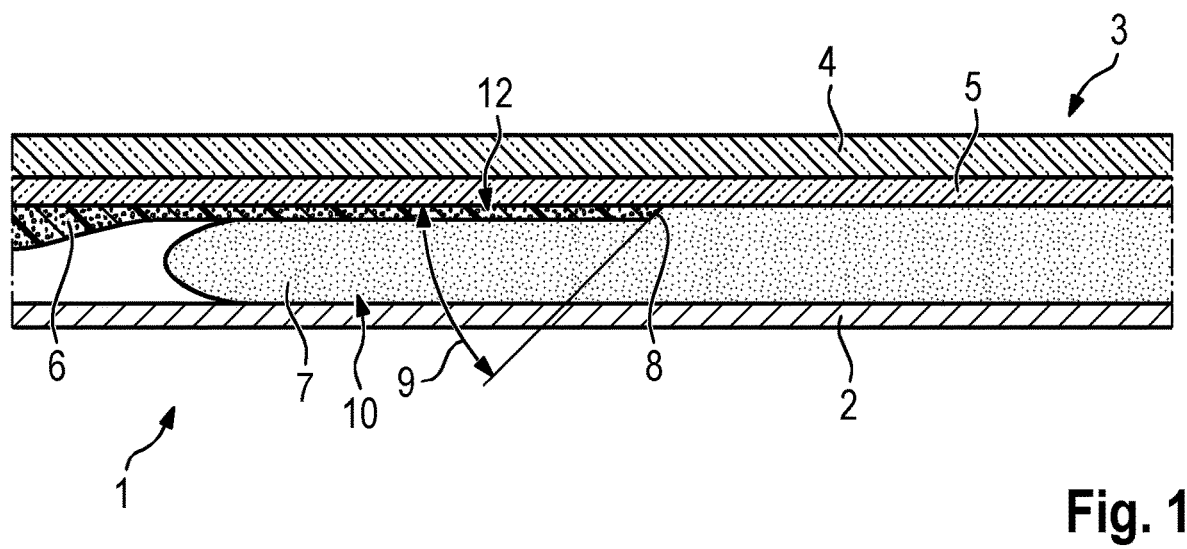
FIG. 1 shows the view of a section taken along line I-I in FIG. 2.
Figure 2:
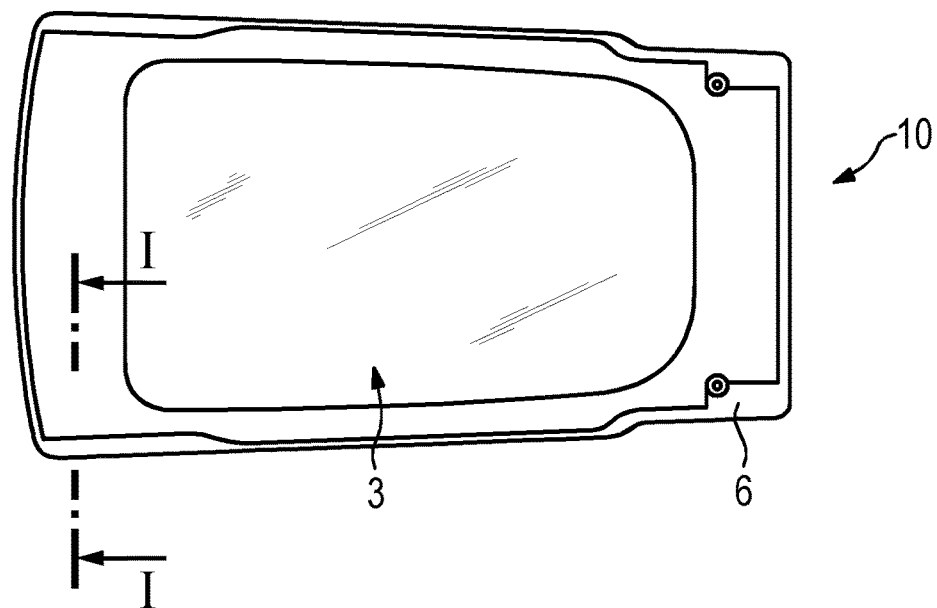
FIG. 2 shows a bottom view of a roof-attachment system for attaching a glass roof to the bodyshell of a motor vehicle.

A motor vehicle 1 having a bodyshell 2 is illustrated in section through a roof-attachment system 10 in FIG. 1. In FIG. 2, the section through the roof-attachment system 10 is indicated by a line I-I.

The roof-attachment system 10 serves to attach a glass roof 3 to the bodyshell 2 of the motor vehicle 1. The glass roof 3 is formed from laminated glass, with a laminated-glass layer 4 and laminated-glass layer 5.

The glass roof 3 is surrounded with a foam surround or encapsulation 6. The glass roof 3 with the foam surround 6 is fastened to the bodyshell 2 by an adhesive 7. A step 12 is formed between the adhesive 7 and the glass roof 3.

In the region of the step 12, a chamfer 8 is provided in the foam surround 6 between the adhesive 7 and the bodyshell 2. The chamfer 8 encloses a chamfer angle 9 of approximately forty-five degrees between the foam surround 6 and the glass roof 3.

Figure 3:
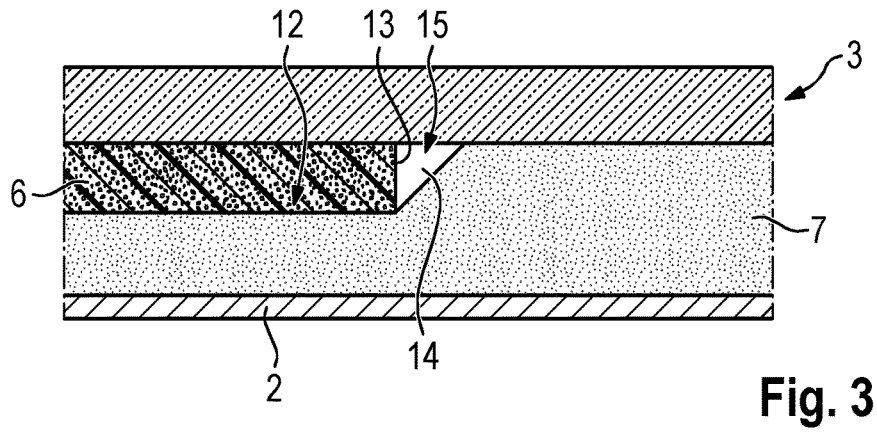
FIG. 3 shows an enlarged detail from FIG. 1 relating to a conventional roof-attachment system.

FIG. 3 illustrates an enlarged detail of a step 12 of a conventional roof-attachment system without any chamfer (8 in FIG. 1). In the case of conventional roof-attachment systems, the foam surround 6, as can be seen in FIG. 3, has a rectangular profile 13. As seen in the section illustrated, this gives rise to a cavity 14 between the foam surround 6 and the adhesive 7, in the region of the step 12, and this cavity constitutes a potential leakage location 15 in the roof-attachment system.

Figure 4:
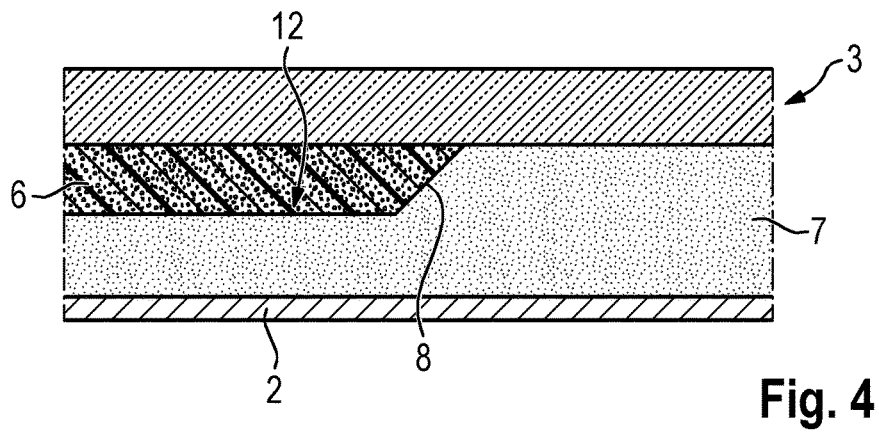
FIG. 4 shows an enlarged detail from FIG. 1 having a chamfer on a foam surround of the glass roof.

It can be seen in FIG. 4 that the potential leakage location (15 in FIG. 3) can be minimized or sealed by the chamfer 8. This creates a better resting surface for the adhesive 7 during production. It is possible for any corners in the region of the step 12 between the foam surround 6 and the adhesive 7, as can be seen in FIG. 4, to be filled with adhesive 7.

Figure 5:
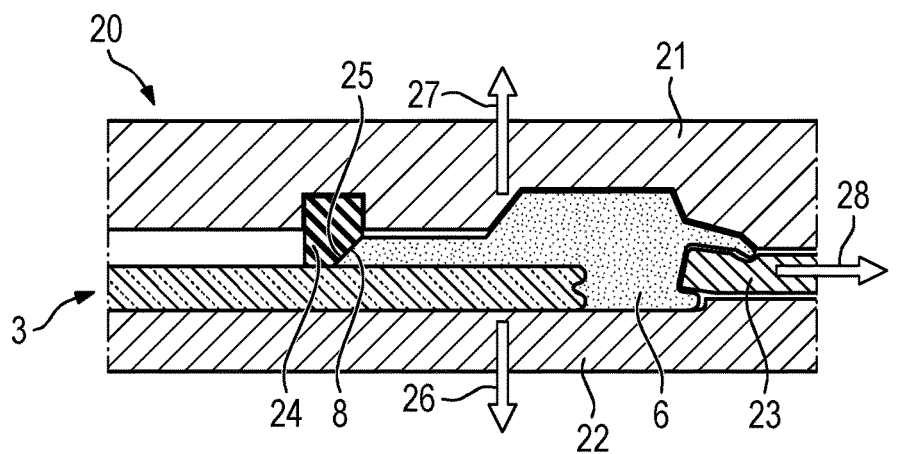
FIG. 5 shows a tool for encapsulating the glass roof or surrounding the same with foam.

A tool 20 for surrounding the glass roof 3 with foam or encapsulating the same in the foam surround 6 is illustrated in section in FIG. 5. The tool 20 comprises an upper tool half 21 and a lower tool half 22. On the right-hand side in FIG. 5, a slide 23 is provided between the two tool halves 21, 22.

A seal 24 made of an elastomeric material, such as silicone, is arranged in the tool 20. In the exemplary embodiment illustrated, the seal 24 is positioned in the upper tool half 21. The seal 24 projects, by way of a shaping geometry 25, into a cavity between the two tool halves 21 and 22. The shaping geometry 25 serves to form the chamfer 8 when the glass roof 3 is being encapsulated in the foam surround 6.

Arrows 26 and 27 indicate how the two tool halves 21, 22 are moved apart from one another in order for the glass roof 3 with the foam surround 6 to be demolded. An arrow 28 indicates an opening movement of the slide 23. The slide 23 serves to form a specific lip geometry on the right-hand side of the foam surround 6 in FIG. 5.

In the installed state, the glass roof 3 with the foam surround 6, in a manner different to the illustration in FIG. 5, has been rotated through one hundred and eighty degrees, as can be seen in FIGS. 1 and 4. When the glass roof 3 is being encapsulated, the seal 24 prevents any contact between the upper tool half 21 and the glass roof 3. This prevents the glass roof 3 from being damaged in an undesirable manner.

LIST OF REFERENCE SIGNS

1 Motor vehicle
2 Bodyshell
3 Glass roof
4 Laminated-glass layer
5 Laminated-glass layer
6 Foam surround
7 Adhesive
8 Chamfer
9 Chamfer angle
10 Roof-attachment system 12 Step
13 Rectangular profile
14 Cavity
15 Potential leakage location
20 Tool
21 Tool half
22 Tool half
23 Slide
24 Seal
25 Shaping geometry
26 Arrow
27 Arrow
28 Arrow

What is claimed:

1. A roof-attachment system for attaching a glass roof to a bodyshell of a motor vehicle, said roof-attachment system comprising:
    a foam surround that is (i) positionable between the glass roof and the bodyshell and (ii) directly positionable against the glass roof; and
    an adhesive that is configured to be sandwiched directly between the glass roof and the bodyshell as well as sandwiched directly between the foam surround and the bodyshell for connecting together the glass roof, the foam surround and the bodyshell, so as to attach the glass roof on the bodyshell in a materially bonded manner,
    wherein the foam surround includes a chamfer that is positionable at an interface between the glass roof and the adhesive, wherein a first edge of the chamfer is configured to be positioned against the glass roof and covered by the adhesive, and a second edge of the chamfer is positioned to be spaced apart from the bodyshell and covered by the adhesive.

2. The roof-attachment system as claimed in claim 1, wherein, as viewed in cross section, the chamfer runs rectilinearly between the glass roof and the adhesive.

3. The roof-attachment system as claimed in claim 1, wherein a chamfer angle between the glass roof and the foam surround is greater than twenty-five degrees and smaller than sixty-five degrees.

4. The roof-attachment system as claimed in claim 1, wherein the foam surround and the adhesive are connected to one another in a materially bonded manner in a region of the chamfer.

5. A motor vehicle having the glass roof which is attached to the bodyshell of the motor vehicle by the roof-attachment system as claimed in claim 1.

6. The roof-attachment system as claimed in claim 1, wherein the foam surround is elongated and the chamfer is disposed on one end of the foam surround.

7. The roof-attachment system as claimed in claim 1, wherein an entirety of the foam surround is encapsulated between the glass roof and the body shell.

8. The roof-attachment system as claimed in claim 1, wherein the foam surround includes a flat and straight top surface and a flat and straight bottom surface, and the chamfer extends between the flat top surface and the flat bottom surface.

9. The roof-attachment system as claimed in claim 1, wherein a thickness of the adhesive is greater than a thickness of the foam surround.

10. The roof-attachment system as claimed in claim 1, wherein components of the roof-attachment system are stacked on top of one another in the following order: body shell, adhesive, foam surround and glass roof.

* * * * *